United States Patent [19]

Tada

[11] Patent Number: 5,161,338
[45] Date of Patent: Nov. 10, 1992

[54] LAMINATED RUBBER SUPPORT ASSEMBLY

[76] Inventor: Hideyuki Tada, 7-23-103, Nagao 3-chome, Jyonan-ku, Fukuoka-shi, Fukuoka-ken, Japan

[21] Appl. No.: 492,158

[22] Filed: Mar. 13, 1990

[51] Int. Cl.$^5$ .............................................. B32B 9/00
[52] U.S. Cl. .................. 52/167 R; 428/192; 428/411.1
[58] Field of Search ............... 52/167; 428/192, 411.1

[56] References Cited

U.S. PATENT DOCUMENTS 4,474,729 10/1984 Schoening et al. ................. 376/461

OTHER PUBLICATIONS

A Study on Rubber Bearings Used in Base Isolation Systems, Nishizawa et al., the paper presented at 134th technical meeting of Rubber Division, A.C.S., 1988.

Primary Examiner—Patrick J. Ryan
Assistant Examiner—Kam F. Lee
Attorney, Agent, or Firm—Nikaido, Marmelstein, Murray & Oram

[57] ABSTRACT

A laminated rubber support assembly which earthquake-proofs buildings. It comprises a plurality of rigid plates arranged to alternate with rubber-like elastic plates and adapted to support a heavy object in such a manner as to allow the object to swing horizontally. This laminated rubber support assembly is characterized in that at least the peripheral region of each rubber-like elastic plate interposed between rigid plates is not bonded to the rigid plates.

1 Claim, 2 Drawing Sheets

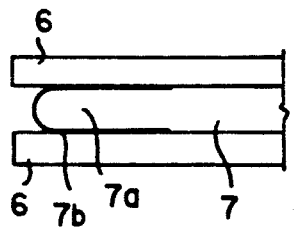 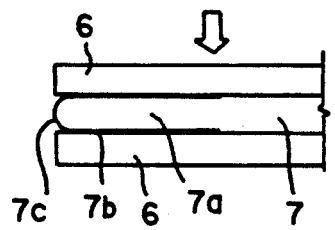 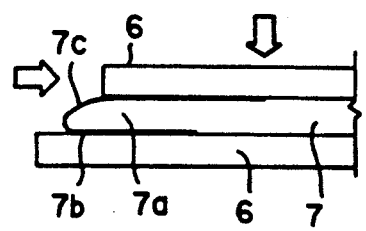
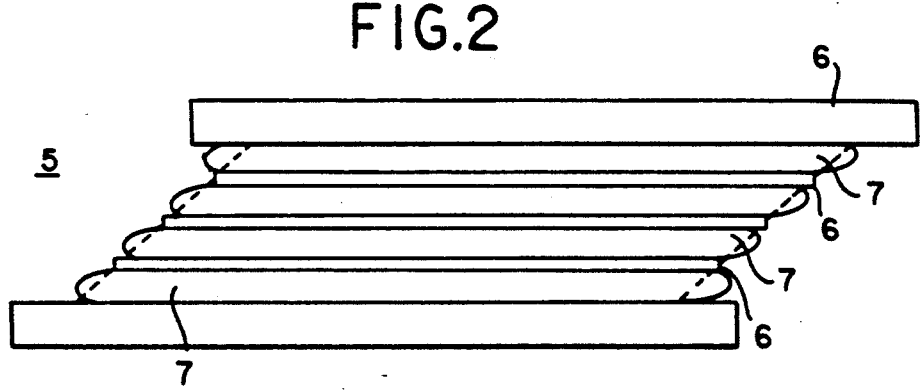
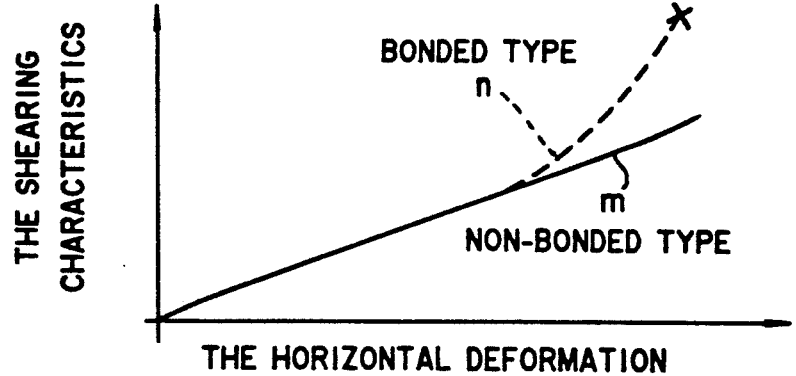
FIG.3

LAMINATED RUBBER SUPPORT ASSEMBLY

BACKGROUND OF THE INVENTION

1. Field of the Invention

The present invention relates to a laminated rubber support assembly utilized for earthquake-proofing buildings and other structures.

2. Description of the Prior Art

As for a foundation material for protecting buildings and other structures against earthquakes, a laminated rubber support assembly as shown in FIG. 4 is known (Japanese Patent Application Disclosure No. 209347/1982). This laminated rubber support assembly 1 comprises a plurality of steel plates 2 and thin rubber plates 3 alternating with and vulcanization-bonded to the steel plates 2. In this assembly, since the ratio of the vertical spring rigidity to the horizontal spring rigidity can be greatly increased, it supports a building 4, which is a heavy object, in a stable manner and if an earthquake should occur, it allows the building to swing horizontally at a low speed with a period which is longer than the period of the earthquake, thus decreasing the input acceleration of the earthquake. Therefore, the earthquake resisting strength required of buildings can be made much lower than in the case of conventional rigid structure foundations which fix a building directly to the ground. Particularly, it facilitates the construction of high-rise buildings.

When the behavior of the rubber plates 3 of the laminated rubber support assembly 1 is observed, the following is found.

In the no-load state before the vulcanization-bonded laminate is installed, the laminate has been finished such that each rubber plate 3 is inwardly recessed with respect to the steel plates 2, as shown in FIG. 6 (a). In the installed state in which it is interposed between the building and the foundation, each rubber plate 3 is compressed and its peripheral region is arcuately bulged, as shown in FIG. 6 (b). After installation, if an earthquake should occur to cause a horizontal displacement of each steel plate 2, then, as shown in FIG. 6 (c), since each rubber plate 3 has its upper and lower surfaces bound by the steel plates 2, the whole is deformed under shearing stress. At this time, the exposed portion of the peripheral region of each rubber plate is obliquely stretched, as shown in FIG. 6 (c); however, since this peripheral region is also subjected to lateral tension from the inner region, it is in the highly tensioned state as compared with the inner region. Particularly when it is deformed to a large extent, it becomes harder, thus increasing the horizontal spring constant, a fact which decreases the earthquake-proofing capacity while causing the peripheral region to break as at 3a in FIG. 6 (c).

SUMMARY OF THE INVENTION

Accordingly, the invention provides a construction which prevents the peripheral region of the rubber plate from being subjected to high tension during great deformation. With this construction, the horizontal spring constant is held substantially constant during great deformation, eliminating the danger of the rubber plates breaking during great deformation, thereby increasing the earthquake-proofing capacity and durability of the laminated rubber support assembly.

The invention discloses a laminated rubber support assembly comprising a plurality of rigid plates arranged to alternate with rubber-like elastic plates and adapted to support a heavy object in such a manner as to allow the object to swing horizontally, the laminated rubber support assembly being characterized in that at least the peripheral region of each rubber-like elastic plate interposed between rigid plates is not bonded to the rigid plates.

In the above arrangement, the peripheral region of each rubber-like elastic plate is simply in contact with and held between rigid plates and not fixed to them. Therefore, as compared with the conventional completely bonded type, it can move rather freely with respect to the upper and lower rigid plates.

Therefore, when the upper and lower rigid plates make horizontal relative movement, the peripheral region follows the movement and starts rolling, so that the lateral tensile force from the inner region is absorbed by the material of the peripheral region being deformed. Further, since the surface area of the peripheral region is large, the tensile force acting on this portion is dispersed and minimized.

As a result, the phenomenon of the peripheral region being hardened during great deformation no longer occur, preventing the peripheral region from breaking and the horizontal spring constant from increasing during great deformation.

BRIEF DESCRIPTION OF THE DRAWINGS

FIGS. 1 (a), (b) and (c) are fragmentary sectional views of a laminated rubber support assembly according to the present invention, showing the no-load state, the compressed state and the compressed sheared state thereof, respectively;

FIG. 2 is a sectional view showing the deformed state of the laminated rubber support assembly of the invention;

FIG. 3 is a graph showing the shearing characteristics m of the laminated rubber support assembly of the invention with respect to the horizontal deformation of the laminated rubber support assembly of the invention in comparison with the characteristics n of a conventional laminated rubber support assembly;

DESCRIPTION OF THE PREFERRED EMBODIMENTS

Figure 4:
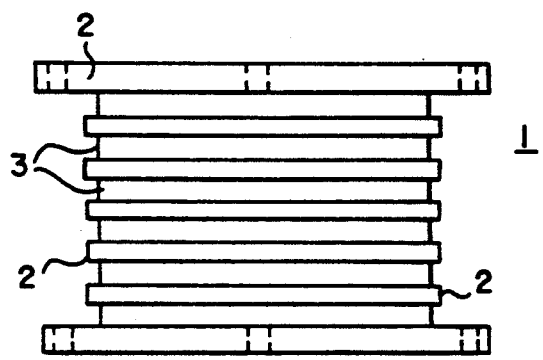
FIG. 4 is a front view showing the common construction of laminated rubber support assemblies.
Figure 5:
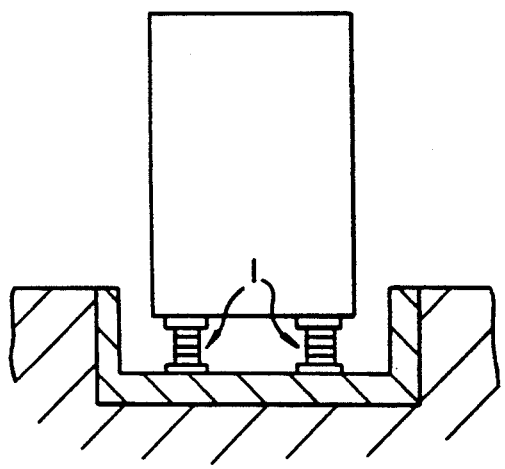
FIG. 5 is a front view showing a construction for earthquake-proofing buildings by using laminated rubber support assemblies.
Figure 6A:
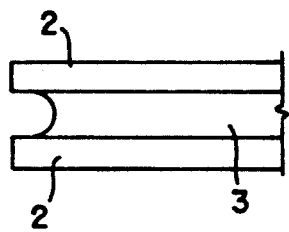
FIGS. 6 (a), (b) and (c) are fragmentary sectional views of a conventional laminated rubber support assembly, showing the no-load state, the compressed state and the compressed sheared state thereof, respectively.
Figure 6B:
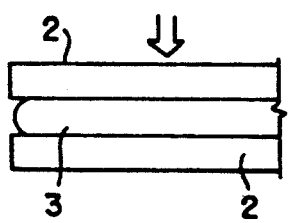
Figure 6C:
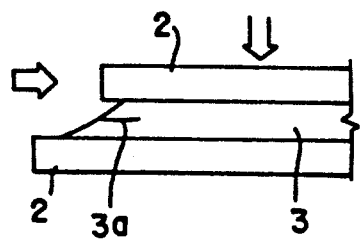

A laminated rubber support assembly 5 according to the present invention, as shown in FIGS. 1 (a), (b) and (c) and FIG. 2, comprises a rigid plates 6, such as steel plates, and rubber-like elastic plates 7 of natural rubber, synthetic rubber or the like. The plates 6 and 7 are alternately laminated to each other in such a manner that the peripheral region of each rubber-like elastic plate 7 is not bonded to the rigid plates 6. That is, aside from the peripheral region, the central region alone is fixed to the rigid plates as by vulcanization, the peripheral region being simply in contact therewith. In this case, the lateral end of the rubber-like elastic plate 7 is bulged outward and connected to the upper and lower surfaces by an arc, as shown in FIG. 1 (a). This is preferable in that it facilitates rolling. When the laminated rubber support assembly 5 constructed in the manner described above is installed between a heavy object, such as a building, and a foundation therefor, the lateral end thereof projects outward owing to the compression load, as shown in FIG. 1 (b). When the laminated rubber support assembly 5 is horizontally deformed for earthquake-proofing operation, as shown in FIG. 2, the peripheral region of each rubber-like elastic plate is deformed as shown in FIG. 1 (c). This will now be described in more detail.

The non-bonded surface 7b of the peripheral region 7a follows the movement of the rigid plates 6 with predetermined friction force, so that the material of the peripheral region starts rolling. At this time, since the material of the peripheral region is not bound by the rigid plates 6, it can be elastically deformed more freely than the material of the bonded inner region. Therefore, the tensile force directed to the lateral end 7c due to the horizontal relative displacement of the upper and lower rigid plates 6 and the tensile force directed laterally from the inner region are dispersed, so that the peripheral region 7a will not be hardened even during great deformation. Therefore, the phenomenon of the outer surface of the peripheral region being broken during great deformation no longer occur, and the horizontal spring constant is maintained substantially constant even during great deformation, developing earthquake-proofing characteristics effective also in withstanding great earthquakes.

The non-bonded type construction described above has characteristics such that the greater the load, the greater the friction force of the non-bonded surface 7b acting on the rigid plate 6, so that the area which performs the function of a spring increases, thus increasing the spring constant. This means that a single type of laminated rubber support assembly can be used both for heavier buildings and for less heavy buildings. That is, to obtain the primary intrinsic period effective in withstanding earthquakes, a greater spring constant is required for heavier buildings while a smaller spring constant is required for less heavy buildings.

In addition, in the above embodiment, the rubber-like elastic plate 7, aside from its peripheral region, has been bonded to the rigid plates 6. However, in the case where the laminated rubber support assembly is utilized for earthquake-proofing buildings, since the friction force produced by surface pressure due to load is generally greater than the shearing force produced, all surface may be left non-bonded; the holding of the upper and lower rigid plates 6 and rubber-like elastic plate 7 is effected by this friction force only. In this case, the bonding process becomes unnecessary, lowering the manufacturing cost. In addition, in this complete-surface non-bonded construction, it is necessary that the positional relation between the upper and lower rigid plates 6 and the rubber-like elastic plate 7 be maintained constant during the time the assembly is installed under a building. As for means therefor, there may be contemplated the use of temporary fixing members for temporarily fixing the assembly over its upper and lower end rigid plates, the use of a vibration energy absorbing rubber member made of such material as elastoplastic body, viscoelastic body, lead or highly attenuating rubber, to surround the laminated rubber support assembly so as to provide a holding construction having a vibration attenuating effect, or the use of a soft heat-resistant element to surround the laminated rubber support assembly to provide a holding construction which is also fire-resistant. In the holding construction having a vibration attenuating effect and the holding construction which is fire-resistant, since the laminated rubber support assembly in the interior is protected from the open air, its life is prolonged. Particularly in the case of the holding construction having a vibration attenuating effect, the psychological anxious feeling, associated with the complete-surface non-bonded type laminated rubber support assembly, that the component layers would be displaced sideways (which has been proved to be nothing more than overanxiousness) can be wiped away; thus, the residents feel greater confidence in the building to withstand earthquakes.

In addition, besides serving for earthquake-proofing buildings, the laminated rubber support assembly of the invention can be used also as a damper for machines.

In the present invention, since the peripheral region of each rubber-like elastic plate is made independent of the rigid plates rather than bonded thereto, the peripheral region is prevented from being hardened during great deformation, avoiding damage and an increase in horizontal spring constant, thereby providing an increased capacity to withstand earthquakes.

What is claimed is:

1. A laminated support assembly comprising:
   an upper rigid plate;
   a lower rigid plate; and
   a plurality of rigid plates alternated with elastic plates for vertically supporting a heavy object and allowing said supported heavy object to be oscillated horizontally, said rigid plates being horizontally longer than said elastic plates in a non-loaded state, wherein at least a peripheral region of each elastic plate, interposed between said rigid plates, is not bonded to said rigid plates.

* * * * *